(12) United States Patent
Baleine et al.

(10) Patent No.: US 9,654,741 B2
(45) Date of Patent: May 16, 2017

(54) SYSTEM AND METHOD FOR OPTICAL FIBER BASED IMAGE ACQUISITION SUITABLE FOR USE IN TURBINE ENGINES

(71) Applicant: Siemens Energy, Inc., Orlando, FL (US)

(72) Inventors: Erwan Baleine, Orlando, FL (US); Varun A V, Bangalore (IN); Paul J. Zombo, Cocoa, FL (US); Zubin Varghese, Bangalore (IN)

(73) Assignee: SIEMENS ENERGY, INC., Orlando, FL (US)

( * ) Notice: Subject to any disclaimer, the term of this patent is extended or adjusted under 35 U.S.C. 154(b) by 371 days.

(21) Appl. No.: 13/937,331

(22) Filed: Jul. 9, 2013

(65) Prior Publication Data
US 2015/0015693 A1 Jan. 15, 2015

(51) Int. Cl.
*H04N 7/18* (2006.01)
*G02B 23/24* (2006.01)
*G02B 23/26* (2006.01)
*G02B 27/58* (2006.01)

(52) U.S. Cl.
CPC ......... *H04N 7/183* (2013.01); *G02B 23/2469* (2013.01); *G02B 23/26* (2013.01); *G02B 27/58* (2013.01); *G02B 2207/129* (2013.01)

(58) Field of Classification Search
CPC .... H04N 7/183; G02B 23/2469; G02B 23/26; G02B 27/58
USPC .......................... 348/82, 61, 65, 81, 92, 143
See application file for complete search history.

(56) References Cited

U.S. PATENT DOCUMENTS

| | | | |
|---|---|---|---|
| 4,281,929 A | 8/1981 | Lord et al. | |
| 4,849,626 A | 7/1989 | Franklin et al. | |
| 5,313,306 A * | 5/1994 | Kuban .............. | G06F 17/30017 348/240.99 |
| 5,986,752 A | 11/1999 | Morito et al. | |
| 7,486,864 B2 | 2/2009 | Diatzikis | |
| 8,184,151 B2 | 5/2012 | Zombo et al. | |

(Continued)

FOREIGN PATENT DOCUMENTS

| | | |
|---|---|---|
| WO | 2008144831 A1 | 12/2008 |
| WO | 2011034661 A1 | 3/2011 |
| WO | 2012021450 A1 | 2/2012 |

OTHER PUBLICATIONS

Candes et al., Robust Uncertainty Principles: Exact Signal Reconstruction From Highly Incomplete Frequency Information, IEEE Transactions on Information Theory, Jun. 2004.

*Primary Examiner* — Thai Tran
*Assistant Examiner* — Nien-Ru Yang (57) ABSTRACT

A system and a method for image acquisition suitable for use in a turbine engine are disclosed. Light received from a field of view in an object plane is projected onto an image plane through an optical modulation device and is transferred through an image conduit to a sensor array. The sensor array generates a set of sampled image signals in a sensing basis based on light received from the image conduit. Finally, the sampled image signals are transformed from the sensing basis to a representation basis and a set of estimated image signals are generated therefrom. The estimated image signals are used for reconstructing an image and/or a motion-video of a region of interest within a turbine engine.

20 Claims, 9 Drawing Sheets

(56) References Cited

U.S. PATENT DOCUMENTS

| | | | |
|---|---|---|---|
| 2004/0212808 A1* | 10/2004 | Okawa | A61B 1/00009 356/479 |
| 2007/0165220 A1 | 7/2007 | Brady et al. | |
| 2008/0144174 A1* | 6/2008 | Lucente | H04N 13/0406 359/463 |
| 2012/0038786 A1* | 2/2012 | Kelly | G02B 26/0833 348/222.1 |

* cited by examiner

SYSTEM AND METHOD FOR OPTICAL FIBER BASED IMAGE ACQUISITION SUITABLE FOR USE IN TURBINE ENGINES

The present invention described herein was developed at least in part in the course of Advanced Turbine Development Program executed under Contract No. DE-FC26-05NT42644 between Siemens Energy Incorporated and United States Department of Energy. Accordingly, the United States Government may have certain rights in this invention.

FIELD OF THE INVENTION

The present invention generally relates to imaging systems. In particular, the present invention relates to system and method for optical fiber based image acquisition suitable for use in a turbine engine.

BACKGROUND OF THE INVENTION

As well known in the art, optical fiber technology has enabled realization of imaging systems known as industrial endoscopes (or borescopes) which are widely used in various industrial applications. Such imaging systems provide means for inspecting such internal structures enclosed within, for example, an industrial machine, that are otherwise inaccessible and can not be inspected with direct line of sight imaging modalities without first painstakingly dismantling the industrial machine.

Such imaging systems are essentially based on using a fiber bundle as an image conduit. At a proximal end of the image conduit, an optical arrangement focuses light gathered from a region of interest onto a plane of optical fiber bundle. The fiber bundle transmits the light from the proximal end to a distal end in the form of individual pixels, one pixel per optical fiber included in the fiber bundle. At the distal end of the image conduit, another optical arrangement focuses the light onto an image plane. A set of light sensing elements, such as a charge-coupled device (CCD) array, a complementary metal-oxide semiconductor (CMOS) array, a photographic film, and so on, are arranged along the image plane to sense the light received at the image plane such that an image is accordingly generated. In a typical use case, the proximal end of the image conduit is inserted through a small opening to reach to an otherwise inaccessible area within an interior of a machine or a component thereof. Such imaging systems are generally known in the prior art such as those disclosed in U.S. Pat. No. 5,986,752 issued to Morito et al, U.S. Pat. No. 4,849,626 issued to Franklin et al, U.S. Pat. No. 4,281,929 issued to Lord et al, and so on.

Although such imaging systems are widely available in general and satisfactorily address several desired applications, their use in certain applications poses specific challenges. One such application is online condition monitoring in turbine engines.

In a typical turbine engine, also known as a gas turbine or a combustion turbine, an upstream rotating compressor is coupled to a downstream turbine, and a combustion chamber is located in-between. A gas stream enters the turbine engine from the compressor end and is highly pressurized in the upstream compressor; the compressed gas stream subsequently enters the combustion chamber at a high velocity, fuel is added thereto and ignited to impart additional energy to the gas stream; the energized gas stream subsequently drives the downstream turbine.

Such turbine engines operate at very high temperatures which may exceed 1,200 degrees Centigrade. Moreover, the gas stream propagates through the turbine engine at extremely high velocities and also, the turbine engine experiences strong mechanical vibrations during operation leading to high mechanical stress. Accordingly, an imaging system desired to be used for online condition monitoring in a gas turbine must be designed to withstand such high-stress environment that is encountered therein.

In recent years, intensive research and development work has been conducted to design imaging systems suitable for online condition monitoring in turbine engines and other such harsh environments; and various systems and methods towards this end have been proposed.

One such system and method is known from U.S. Pat. No. 7,486,864 issued to Diatzikis and assigned to Siemens Energy, Inc. The aforementioned patent discloses an imaging system including at least one photonic crystal fiber having an imaging end and a processing end; an imaging camera operably connected to the processing end of the at least one photonic crystal fiber; and an imaging processor operably connected to the imaging camera. The photonic crystal fiber can comprise a sapphire cladding and defines a hollow core. The imaging end of the at least one photonic crystal fiber can capture light in the area of interest and guides the light to the imaging camera. The processor can generate an image based on the light.

Another such system is known from U.S. Pat. No. 8,184,151 issued to Zombo et al and assigned to Siemens Energy, Inc. The aforementioned patent discloses an imaging system for imaging an internal component within a gas turbine engine. The imaging system includes a flexible imaging bundle comprising an imaging end for imaging a component in a hot gas path of the engine, and a viewing end providing an image of the component at a location displaced from the hot gas path. The imaging end comprises a plurality of receptor sites defining an imaging plane for receiving an image of the component. The flexible imaging bundle defines a plurality of separate light paths defined by a plurality of high temperature optical elements, each light path corresponding to a receptor site. The viewing end comprises a plurality of emission sites, each emission site corresponding to a receptor site wherein a location and number of the emission sites forming the viewing end have a one-to-one correspondence to the location and number of the imaging sites forming the imaging end to effect transmission of a coherent image through the flexible imaging bundle from the imaging end to the viewing end.

Despite significant advancements, various state of the art industrial endoscopes suffer from several disadvantages with regard to condition monitoring in a turbine engine.

In current imaging systems, individual optical fibers are mutually optically isolated; each optical fiber transmits light corresponding to an individual pixel in the acquired image. Therefore, in order to obtain an image with a satisfactory resolution level, a fiber bundle with relatively very large number of optical fibers has to be used. This, in turn, leads to an undesirable total thickness of an image conduit used in such imaging systems. As a result, several desired regions of interest within a turbine engine, such as regions located inside a vane, still remain inaccessible.

The problem of unsuitable form-factor is further aggravated in case of imaging systems designed for online condition monitoring in turbine engines due to additional measures required to withstand high temperature and other harsh ambient conditions. In particular, fiber bundles are formed with special coatings on individual fibers for robustness, which undesirably prevent high density packing of the optical fibers. If it is desirable to keep the thickness of fiber bundle small enough (e.g. less than 8 mm) such as to fit through constricted regions such as the inside a vane insert, the number of optical fibers that may be included in the fiber bundle are limited to a few hundreds. The limitation of the total number of fibers to a few hundreds restricts any type of imaging applications to very low resolution.

In light of the foregoing, there is a need for an improved system and method for image acquisition suitable for use in a turbine engine. The improved system and method should ensure a compact and thin form-factor of the system and in particular, an image conduit therein, such that accessibility of various constricted regions within a turbine engine is improved. At the same time, the improved system and method should facilitate image acquisition with a satisfactorily high resolution level.

SUMMARY OF THE INVENTION

An object of the present invention is to provide a system and a method for image acquisition suitable for use in a turbine engine for online condition monitoring.

Another object of the present invention is to provide a system and a method for image acquisition suitable for use in a turbine engine such that accessibility to various regions of interest located inside a turbine engine is improved.

Yet another object of the present invention is to provide a system and a method for image acquisition suitable for use in a turbine engine such that resolution of images and/or motion-videos is increased.

The aforementioned objects of the present invention are achieved by a system and a method for image acquisition suitable for use in a turbine engine according to claim 1 and claim 11 respectively. Further embodiments of the present invention are addressed in the dependent claims.

The underlying idea of the present invention is to provide an image conduit formed using a limited number of imaging fibers fabricated to withstand high temperature conditions, and implementing a sparse-signal reconstruction technique to generate a high resolution image and/or motion-video of a region of interest within a turbine engine to enable efficient online condition monitoring.

In a first aspect of the present invention, a system for image acquisition suitable for use in a turbine engine is provided. The system comprises an optical modulation device, an image conduit, a sensor array, and a signal processing device. The optical modulation device is configured for projecting light received from a field of view in an object plane onto an image plane. The optical modulation device is characterized by a first transfer function. The image conduit comprises a set of imaging fibers arranged to form an image acquisition end and an image processing end. The image acquisition end is arranged to substantially coincide with the image plane such that each imaging fiber acquires light projected onto a corresponding region within the image plane. The light acquired through the image acquisition end is transferred to the image processing end. The image conduit is characterized by a second transfer function. The sensor array comprises a set of light sensing elements arranged to receive light from individual imaging fibers at the image processing end, and generate corresponding sampled image signals in a sensing basis. The signal processing device is configured for transforming the sampled image signals from the sensing basis to a representation basis, and generating a set of estimated image signals therefrom based on said first and second transfer functions, wherein the representation basis provides a sparser representation of the sampled image signals relative to the sensing basis, and further wherein the number of estimated image signals is greater than the number of sampled image signals.

In a second aspect of the present invention, a method for image acquisition suitable for use in a turbine engine is provided. At a first step, light received from a field of view in an object plane is projected onto an image plane through an optical modulation device. The optical modulation device is characterized by a first transfer function. Thereafter, light is transferred through an image conduit. The image conduit comprises a set of imaging fibers arranged to form an image acquisition end and an image processing end.

The image acquisition end is arranged to substantially coincide with the image plane such that light projected onto individual regions within the image plane corresponding to individual imaging fibers is transferred to the image processing end. The image conduit is characterized by a second transfer function. Subsequently, a set of sampled image signals are generated in a sensing basis based on light received from individual imaging fibers at the image processing end. Finally, the sampled image signals are transformed from the sensing basis to a representation basis and a set of estimated image signals are generated therefrom based on said first and second transfer functions, wherein the representation basis provides a sparser representation of the sampled image signals relative to the sensing basis, and further wherein the number of estimated image signals is greater than the number of sampled image signals.

Thus, the present invention provides improved system and method for image acquisition suitable for use in a turbine engine. According to the techniques of the present invention, a system based on an image conduit with compact form-factor is achieved, thereby, improving accessibility to various regions of interest within the turbine engine. At the same time, resolution of image and/or motion-video produced according to the techniques of the present invention is at least equal to or greater than that achieved using various state of the art solutions in which number of imaging fibers included is several orders of magnitude greater than number of imaging fibers included in the present invention.

BRIEF DESCRIPTION OF THE DRAWINGS

The present invention is further described hereinafter with reference to illustrated embodiments shown in the accompanying drawings, in which.

DETAILED DESCRIPTION OF THE INVENTION

Various embodiments are described with reference to the drawings, wherein like reference numerals are used to refer to like elements throughout. In the following description, for purpose of explanation, numerous specific details are set forth in order to provide a thorough understanding of one or more embodiments. It may be evident that such embodiments may be practiced without these specific details.

Condition monitoring in turbine engines is necessary for identifying potential problems in advance and carry out preventive maintenance and thereby, ensuring safe operation of turbine engines. Such condition monitoring often requires visual inspection of various internal components to verify the integrity thereof. Such visual inspection is performed using a system and a method for image acquisition.

Although off-line inspection may be conducted as part of routine maintenance activities, it is desirable to carry out online condition monitoring in the turbine engine during routine operation thereof. While a variety of structures and materials may be used for inspection of the interior components during downtime of the turbine engine, visual condition monitoring during operation of the turbine engine imposes several restrictions on the imaging systems as explained in the preceding description.

The present invention provides a system and a method for image acquisition suitable for use in turbine engines in which such restrictions are overcome through exploiting techniques related to sparse signal recovery in accordance with theory of compressive sensing.

Compressive sensing, which is a new theory of signal acquisition, set forth by E. Candes, J. Romberg, and T. Tao, in their publication titled "Robust uncertainty principles: Exact signal reconstruction from highly incomplete frequency information", IEEE Transactions on Information Theory, 2004, exploits sparsity in a data signal for optimizing signal acquisition and processing systems. According to this theory, a signal having a sparse representation in at least one basis may be reconstructed from a limited set of non-adaptive, linear measurements in another basis so long as the two bases are mutually incoherent.

In accordance with the technique of compressed sensing, it is necessary that sampling conducted using linear functionals may be represented in terms of matrix multiplication. The technique further stipulates that such matrix should be a random matrix in order to ensure efficient reconstruction of signal using suitable algorithms. Therefore, in accordance with the theory of compressed sensing, a signal is randomly sampled. Subsequent to sampling, the signal is reconstructed using the random samples. A variety of reconstruction algorithms involving iterative optimization procedures have already been proposed towards this end.

In general, image signals have a sparse representation in alternative basis such as Haar Wavelet transform, Discrete Cosine Transform (DCT) and so on. Accordingly, theory of compressive sensing is exploited to achieve efficient image acquisition as set forth in the following description.

Figure 1:
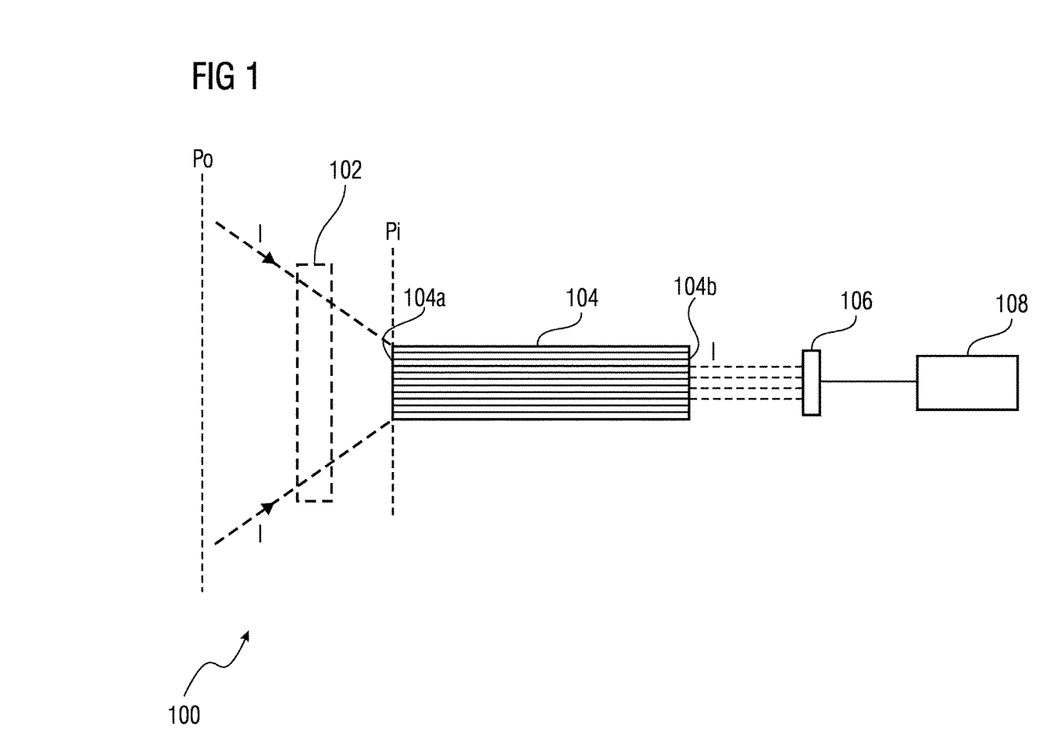
FIG. 1 illustrates a schematic representation of a system for image acquisition suitable for use in a turbine engine in accordance with an embodiment of the present invention.

Referring now to FIG. 1, a schematic representation of a system 100 for image acquisition suitable for use in a turbine engine (not shown) is provided in accordance with an embodiment of the present invention.

It should be noted that while the present invention is being discussed in the context of turbine engines, various techniques of the present invention are readily applicable to any other imaging application.

System 100 includes an optical modulation device 102, an image conduit 104, a sensor array 106, and a signal processing device 108. In addition, FIG. 1 also depicts an object plane $P_o$ and an image plane $P_i$. The path of light through system 100 is indicated through dotted lines marked as 'l'.

The optical modulation device 102 receives light from a field of view in the object plane $P_o$ and projects the light onto the image plane $P_i$. The image conduit 104 includes a set of imaging fibers arranged to form an image acquisition end 104a and an image processing end 104b. The image conduit 104 transfers the light received at the image acquisition end 104a to the image processing end 104b. The light, thus transferred, emanates from the image processing end 104b and is projected onto the sensor array 106. The sensor array 106 includes a set of light sensing elements, each of which converts light received from individual imaging fibers to corresponding sampled image signals in a sensing basis. Subsequently, the sensor array 106 provides the sampled image signals to the signal processing device 108. The signal processing device 108 transforms the sampled image signals from the sensing basis to a representation basis and generates a set of estimated image signals therefrom. The representation basis provides a sparser representation of the sampled image signals relative to the sensing basis. The number of estimated image signals, thus generated, is greater than the number of sampled image signals.

The optical modulation device 102 is capable of modulating the light incident thereon using a series of patterns such as arrays of transmissive, reflective, and/or opaque regions which are individually configurable. The optical modulation device 102 has been depicted using dashed lines in the adjoining figure to indicate that this device is selectively transmissive to light received from the object plane $P_o$. The optical modulation device is characterized by a first transfer function, as will be explained below in conjunction with a specific embodiment.

Figure 2:
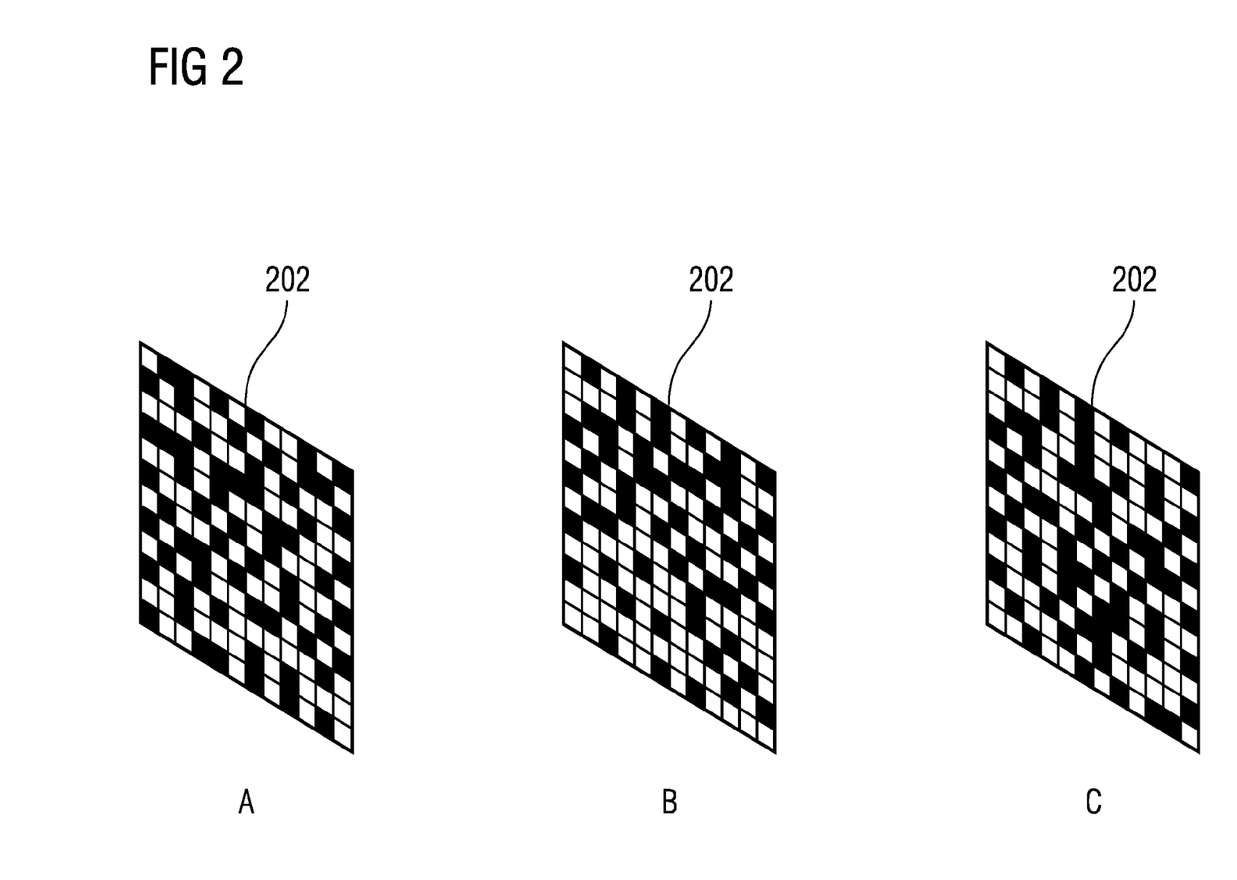
FIG. 2 illustrates a schematic representation of three different configurations of a coded-aperture mask in accordance with an embodiment of the present invention.

In one embodiment of the present invention, the optical modulation device 102 is a coded-aperture mask 202. The coded-aperture mask is advantageously fabricated using high-temperature materials such as to withstand the harsh environment within the turbine engine. In effect, the coded-aperture mask facilitates replacing a optical lens-based arrangement to acquire the light from the object plane $P_o$ and focus on the image plane $P_i$.

A coded-aperture mask is generally known in the art for capturing radiation in such wavelength ranges that are generally not suitable for imaging using conventional lens-assembly based on imaging systems.

The coded-aperture mask includes an array of apertures. Each aperture generates an individual image of the corresponding field of view in the object plane $P_o$ onto the image plane $P_i$. Thus, the light projected onto the image plane $P_i$ corresponds to an overlapping series of images formed through individual apertures. It is however possible to reconstruct an image of the actual field of view using a reconstruction process that takes into account information related to the spatial arrangement of individual apertures on the coded-aperture mask. In this sense, the coded-aperture mask modulates the light received from the object plane $P_o$ and produces an image onto the image plane $P_i$.

In mathematical terms, an intensity pattern of the light on the image plane $P_i$ is related to the intensity pattern of the light in the object plane $P_o$ through a first transfer function $A_1$, mathematically expressed as:

$$y = A_1 x \quad (1)$$

wherein x is the actual light intensity in the object plane $P_o$ and y is the resultant light intensity in the image plane $P_i$.

As noted earlier, compressed sensing requires that sampling conducted using linear functionals may be represented in terms of matrix multiplication where the matrix should be a random matrix in order to ensure efficient reconstruction of signal using suitable algorithms. The first transfer function $A_1$ provides the requisite random matrix from signal acquisition in accordance with techniques of the present invention.

In accordance with various embodiments of the present invention, the coded-aperture mask may have a fixed mask pattern or a reconfigurable mask pattern or a combination thereof.

Figure 3:
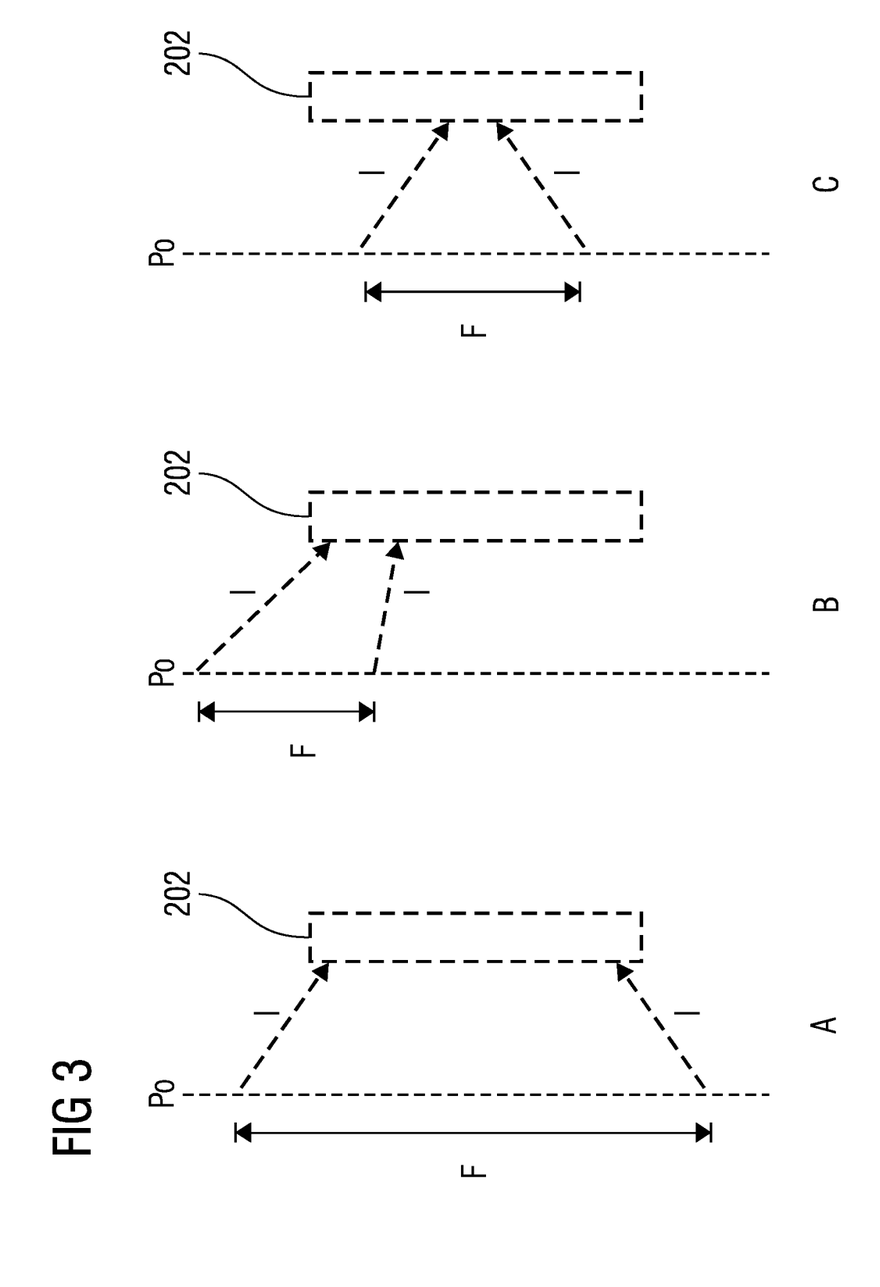
FIG. 3 illustrates a schematic representation of three different fields of view corresponding to three different configurations of a coded-aperture mask in accordance with an embodiment of the present invention.

The embodiment wherein the coded-aperture mask is electrically reconfigurable will now be explained with reference to FIGS. 2 and 3.

Referring to FIG. 2, a schematic representation of three different configurations (A, B, C) of a coded-aperture mask 202 is shown in accordance with an embodiment of the present invention. FIG. 3 illustrates a schematic representation of three different fields of view F corresponding to three different configurations (A, B, C) of a coded-aperture mask 202 in accordance with an embodiment of the present invention.

In this embodiment, the coded-aperture mask 202 is reconfigurable in at least a partial region therein. The reconfigurable region is partitioned into multiple sub-regions; each such sub-region is individually configurable to alter transmissive properties in relation to radiation within a specified wavelength range. As shown in the adjoining figure, white boxes represent transmissive sub-regions while black boxes represent opaque sub-regions within the coded-aperture mask 202. Therefore, the first transfer function $A_1$ associated with the coded-aperture mask 202 is configurable.

In one example, the coded aperture mask 202 is a liquid crystal device, which is operable in the visible and infrared bands. However, in various alternative examples, any suitable electro-optic modulator known in the state of the art may be used to implement the coded-aperture mask 202 depending on the frequency band of radiation of interest. Further, a suitable arrangement is provided to regulate configurations of the coded-aperture mask 202 in accordance with any suitable technique known in the art.

The effective aperture sizes and spacing of the individual apertures on the coded-aperture mask 202 may be regulated to control effective resolution of the coded-aperture mask 202.

The ability to reconfigure pattern of apertures on coded-aperture mask 202 also permits control over field of view captured using the coded-aperture mask 202. Thus, different fields of view F may be achieved using the coded-aperture mask 202, as depicted in FIG. 3 for three different configurations (A, B, C) of the coded-aperture mask 202.

It should be noted that the present invention contemplates use of coded-aperture masks 202 configured for imaging in various wavelength ranges including in infra-red, visible, and ultra-violet wavelength ranges for different applications. Furthermore, coded-aperture mask 202 may be configured for selective wavelength ranges within visible light spectrum.

It should be noted that while in the current embodiment the optical modulation device 102 is disposed intermediate the object plane Po and the image acquisition end 104a, in various alternative embodiments of the present invention, the optical modulation device 102 may be disposed after the image processing end 104b without altering any other parts of the system 100. Furthermore, coded-aperture mask 202 has been explained herein only as a non-limiting example of an optical modulation device 102. For example, in an alternative embodiment of the present invention, the optical modulation device 102 may be implemented using a digital micro-mirror device which is disposed after the image processing end 104b and configured to selective reflect light emanating therefrom to the sensor array 106.

Referring back to FIG. 1, the image conduit 104 is arranged such that the image acquisition end 104a is arranged to substantially coincide with the image plane $P_i$. As a result of this arrangement, each imaging fiber acquires light projected onto a corresponding region within the image plane $P_i$. The light acquired through the image acquisition end 104a is transferred to the image processing end 104b. The image conduit 104 is characterized by a second transfer function $A_2$, mathematically expressed as:

$$y = A_2 x \quad (2)$$

wherein x is the actual light intensity incident on the image acquisition end 104a and y is the resultant light intensity on the image processing end 104b.

Figure 4:
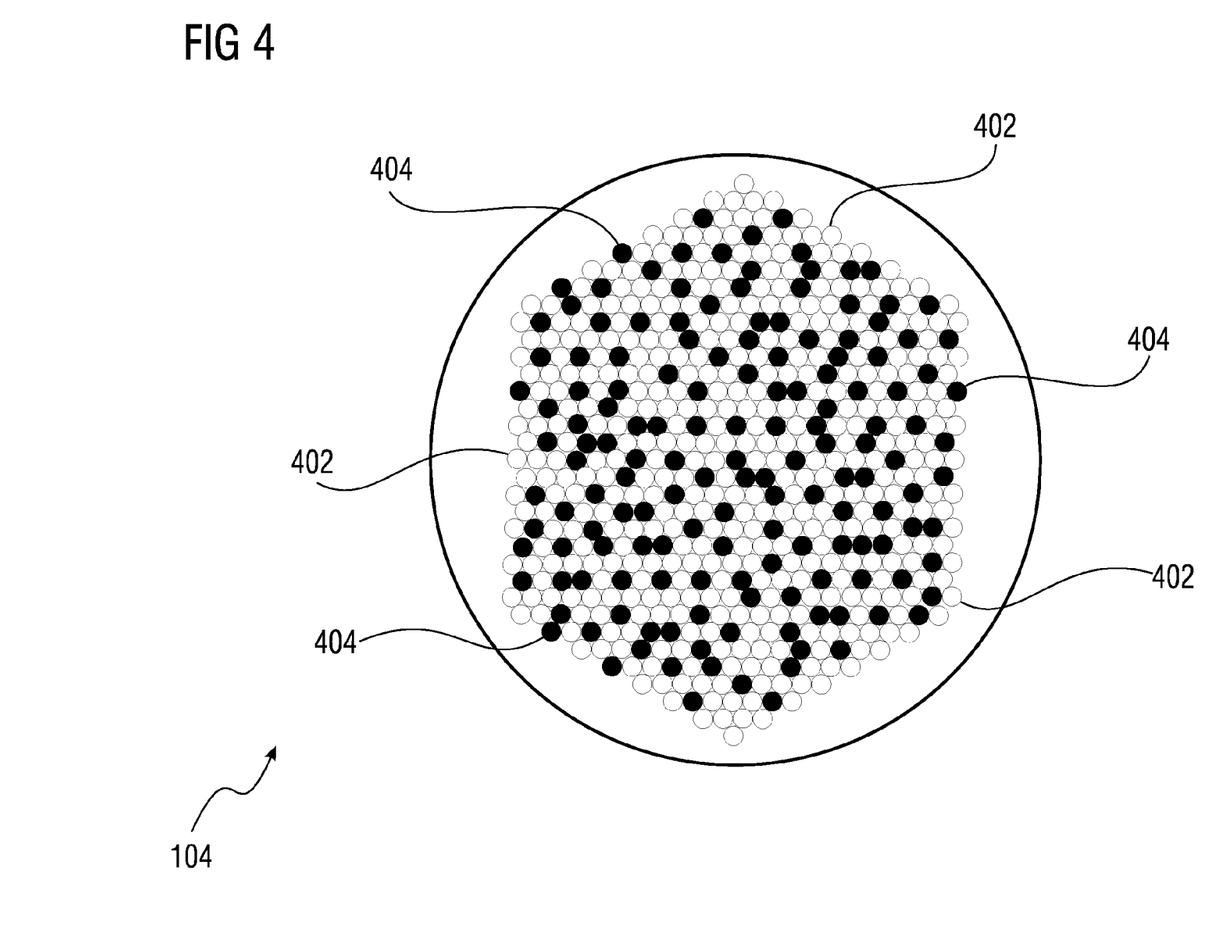
FIG. 4 illustrates a cross-section of an image conduit in accordance with an embodiment of the present invention.

Referring now to FIG. 4, a cross-section of an image conduit 104 is shown in accordance with an embodiment of the present invention.

The image conduit 104 includes a set of imaging fibers 402 and optionally, a set of a set of illuminating fibers 404. The imaging fibers 402 are same as referred to in conjunction with previous figures. The illuminating fibers 404 are configured for receiving illuminating light from a light source (not shown) arranged adjacent to the image processing end 104b and transferring said illuminating light to the image acquisition end 104a such as to illuminate said object plane $P_o$.

Further, the optical fibers 402, 404 are fabricated using such techniques which are suitable for high-temperature applications. In one example, the optical fibers 402, 404 are provided a metallic coating of gold to improve robustness against harsh environments encountered within a turbine engine.

It should be noted that specific geometry and relative arrangement of the optical fibers 402, 404 shown in the adjoining figure are only exemplary in nature. In the state of the art, several different relative arrangements of the imaging fibers 402 and the illuminating fibers 404 are generally well-known and any suitable arrangement may be selected. Also, optical fibers 402, 404 and image conduit 104 may have any desired cross-section and need not necessarily be circular in cross-section.

Various regions of interest with a turbine engine are not well illuminated and accordingly, imaging is difficult in general. When illuminating fibers 404 are used, the light conditions within the turbine engine are improved and accordingly, the quality of images and/or motion-video eventually generated is also improved. However, this is an optional technical feature and may not be required if, for example, imaging is performed exclusively in the infra-red wavelength range.

Referring back to FIG. 1, the light, transferred through the image conduit 104, emanates from the image processing end 104b and is projected onto the sensor array 106.

The sensor array 106 includes a set of light sensing elements. Each light sensing element receives light from individual imaging fibers 402 at the image processing end 104b and converts light, thus received, to corresponding sampled image signals in a sensing basis. Subsequently, the sensor array 106 provides the sampled image signals to the signal processing device 108.

The term 'sensing basis' refers to a domain in which a physical signal is sampled. In the context of the present invention, the sensing basis is a two-dimensional or three-dimensional spatial domain corresponding to the region of interest intended to be imaged using the system and the method of the present invention. In case the sampled image signals are acquired during successive time intervals are collectively considered, the sensing basis is a spatio-temporal domain.

The light sensing elements included in the sensor array 106 are selected based on spectral range of interest. In various exemplary embodiments of the present invention, for near infra-red and visible ranges, charge-coupled device (CCD) arrays, complementary metal-oxide semiconductor (CMOS) arrays, and so on may be used. Similarly, for the far infrared range any suitable sensing modality as per the state of the art may be used.

The present invention contemplates use of sensor arrays 106 in which light sensing elements for different spectral ranges are used together. In one embodiment, the light sensing elements corresponding to different spectral ranges are arranged randomly to form a two-dimensional array. In an alternative embodiment, the light sensing elements corresponding to different spectral ranges are arranged in individual two-dimensional arrays which may be adjoined to form an integrated sensor array with distinct zones corresponding to different spectral ranges. These aspects of the present invention will be explained later in more detail in conjunction with FIGS. 5 through 7.

Still referring to FIG. 1, the sensor array 106 provides the sampled image signals to the signal processing device 108.

The signal processing device 108 is configured for processing the sampled image signals to reconstruct a desired image and/or motion video of the region of interest within the turbine engine. In one embodiment of the present invention, the sampled image signals received from the sensor array 106 are analog signals. The signal processing device 108 first converts the sampled image signals from analog format to digital format using one or more analog-to-digital converters.

Towards this end, the signal processing device 108 implements a compressive sensing reconstruction technique. The sampled image signals are transformed from the sensing basis (spatial or spatio-temporal domain) to a representation basis based on a transform operator T.

In various embodiments of the present invention, the representation basis may be any suitable alternative domain that provides a sparser representation of the sampled image signals relative to the sensing basis. While selecting a representation basis, an important consideration is that the sensing basis and the representation basis should provide an incoherent basis pair. In other words, the signal representation in the sensing basis and the representation should have the least correlation. Examples of such representation basis include, but are not limited to, Haar Wavelet, Discrete Cosine Transform, and so on.

Subsequent to transformation to the representation basis, a set of estimated image signals are generated from the set of sampled image signals based on said first and second transfer functions $A_1$ and $A_2$. The number of estimated image signals, thus generated, is greater than the number of sampled image signals. Thus, the techniques of the present invention advantageously facilitate generating a much higher resolution image for a given number of imaging fibers 402 included in the image conduit 104.

As mentioned earlier, the optical modulation device 102 is characterized by the first transfer function $A_1$ and the image conduit 104 is characterized by the second transfer function $A_2$. Each of these transfer functions (and similarly, optical transfer functions of any other optical elements disposed in the path of light from the object plane $P_o$ to the sensor array 106) is taken into account for generation of estimated image signals. The combined transfer function of the optical elements disposed between the object plane $P_o$ and the sensor array 106 may be denoted using $A_C$, mathematically expressed as:

$$y = A_C x \qquad (2)$$

wherein x is the actual light intensity in the object plane $P_o$ and y is the resultant light intensity received on the sensor array 106.

In accordance with an exemplary embodiment of the present invention, the signal processing device 108 is configured to find solution to a combined minimization problem of $L_2$ norm of $[y - A_C(x)]$ and $L_1$ norm of $T'(x)$ wherein T' denotes an inverse transform operator. However, the above approach is only exemplary in nature. The signal processing device 108 may generate the estimated image signals based on any of the known estimation algorithms, including but not limited to, $L_0$ minimization; $L_1$ minimization; greedy algorithms; convex-optimisation algorithms; and Viterbi algorithm.

In accordance with an embodiment of the present invention, the signal processing device 108 is configured for evaluating the first and the second transfer functions $A_1, A_2$, for a single object plane $P_o$. The estimated image signals thus generated based on the first and the second transfer functions $A_1, A_2$, facilitate reconstructing a two-dimensional image of region of interest within the field of view.

In accordance with another embodiment of the present invention, the signal processing device 108 is configured for evaluating multiple sets of each of the first and the second transfer functions $A_1$, $A_2$, for multiple object planes $P_o$ located at varying depths relative to the image plane $P_i$. The estimated image signals thus generated based on multiple set of the first and the second transfer functions $A_1, A_2$, facilitate reconstructing a three-dimensional image of region of interest within the field of view.

In accordance with another embodiment of the present invention, the signal processing device 108 is configured for integrated processing of the sampled image signals generated during successive time instances. The sampled image signals therefore, reside in a three-dimensional spatio-temporal domain. The estimated image signals are generated for successive time instances in an integrated manner for reconstructing a motion-video in an optimized manner.

With regard to motion-video reconstruction, it should be noted that if a region of interest is such that it follows a predefined periodic motion, such as in case a region of interest is a rotor blade, the reconstruction process may be suitably adapted using image correlation techniques to exploit such knowledge of path of region of interest to facilitates even faster reconstruction.

Figure 5:
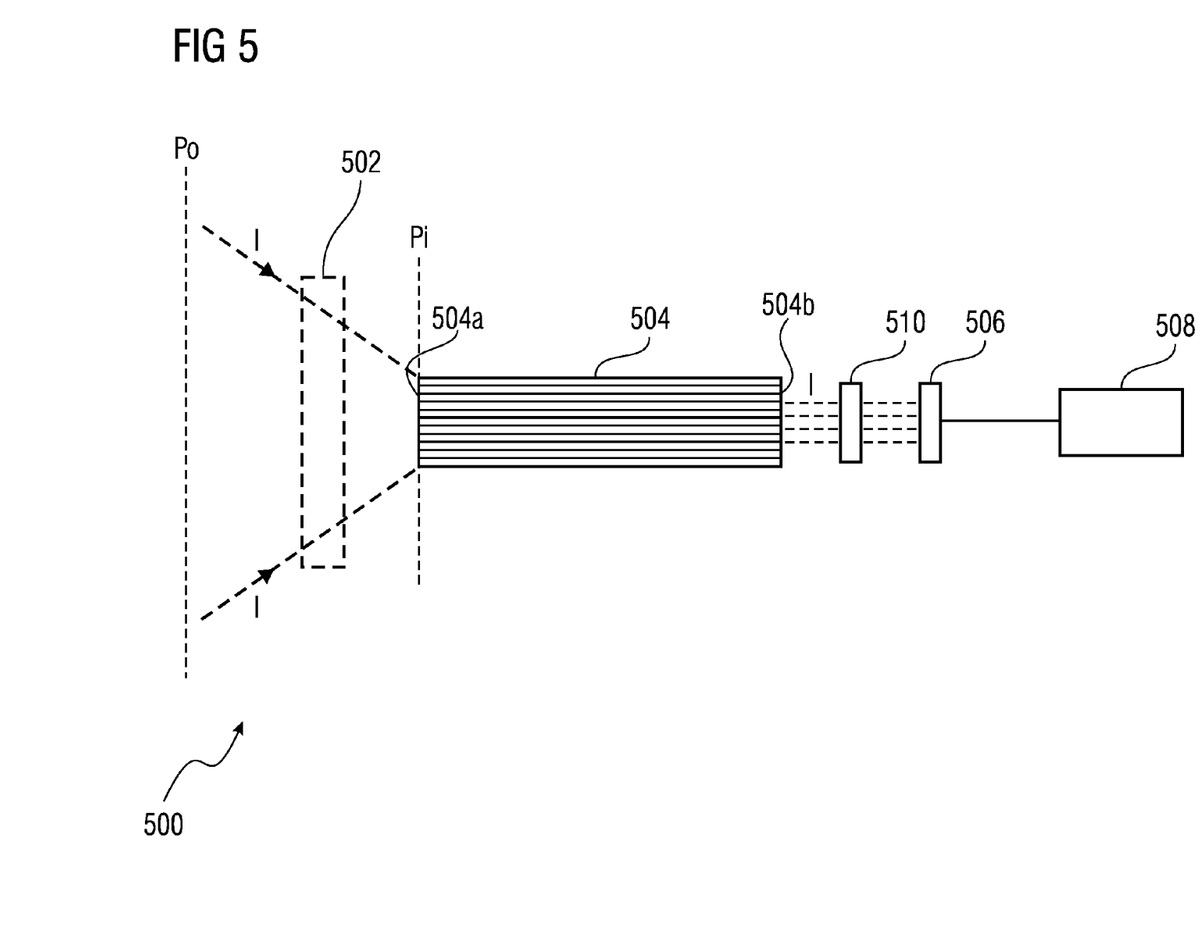
FIG. 5 illustrates a schematic representation of a system for image acquisition suitable for use in a turbine engine in accordance with an alternative embodiment of the present invention.

Referring now to FIG. 5, a schematic representation of a system 500 for image acquisition suitable for use in a turbine engine is shown in accordance with an alternative embodiment of the present invention.

In system 500, various system elements 502 through 508 are same as corresponding system elements 102 through 108, as explained in conjunction with FIG. 1.

In this embodiment, an optical filter assembly 510 is disposed intermediate the image processing end 504b and the sensor array 506. The optical filter assembly 510 includes multiple sets of filter elements and in particular, including at least a first set of filter elements and a second set of filter elements. Each set of filter elements is transmissive to light in a specific wavelength range. The optical filter assembly 510 is arranged relative to the sensor array 506 such as to maintain a one-to-one correspondence between the filter elements and the light sensing elements. Thus, the sensor array 106 generates sampled image signals corresponding at least two different spectral regions.

Figure 6:
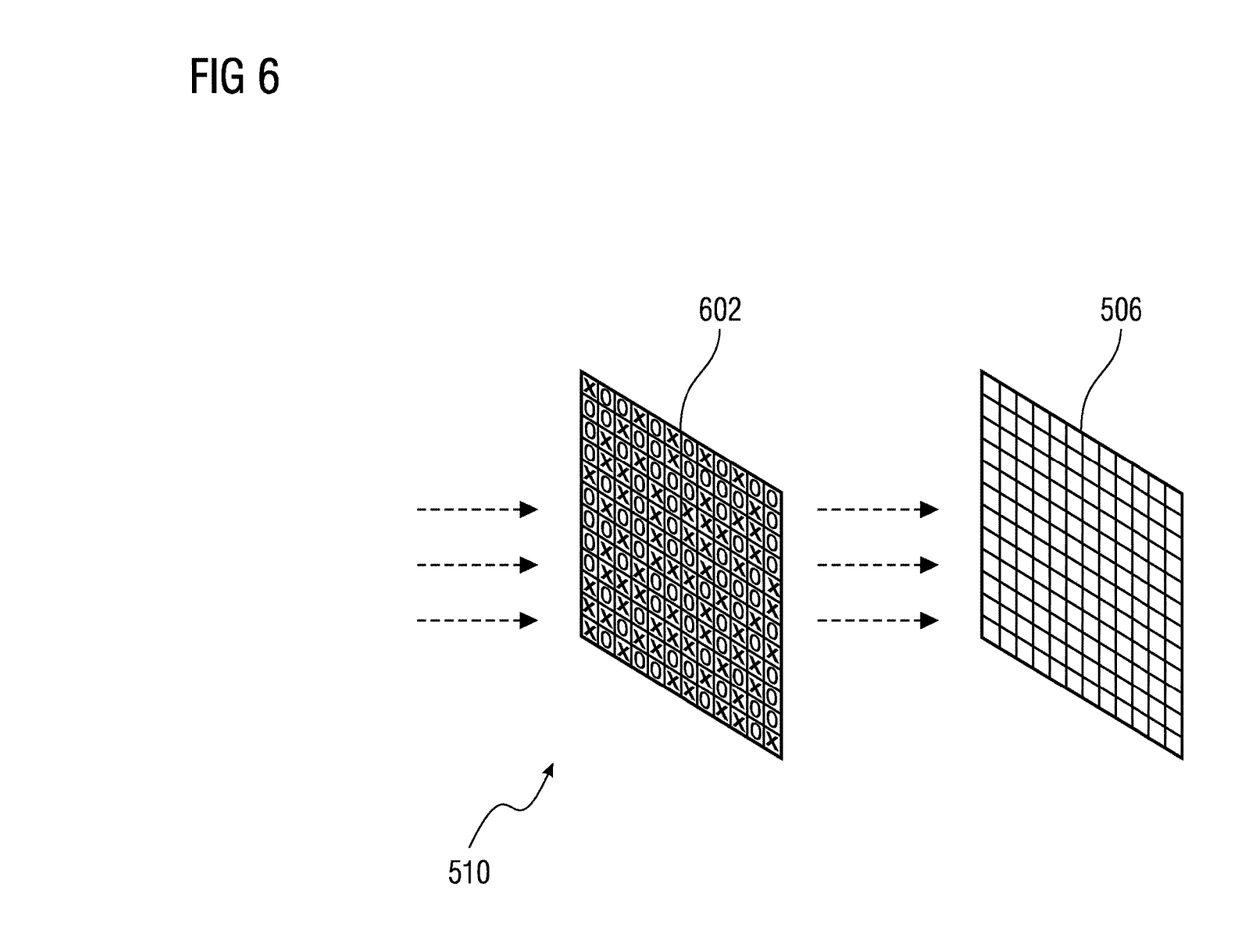
FIG. 6 illustrates a schematic representation of an optical filter assembly in accordance with a first embodiment of the present invention.
Figure 7:
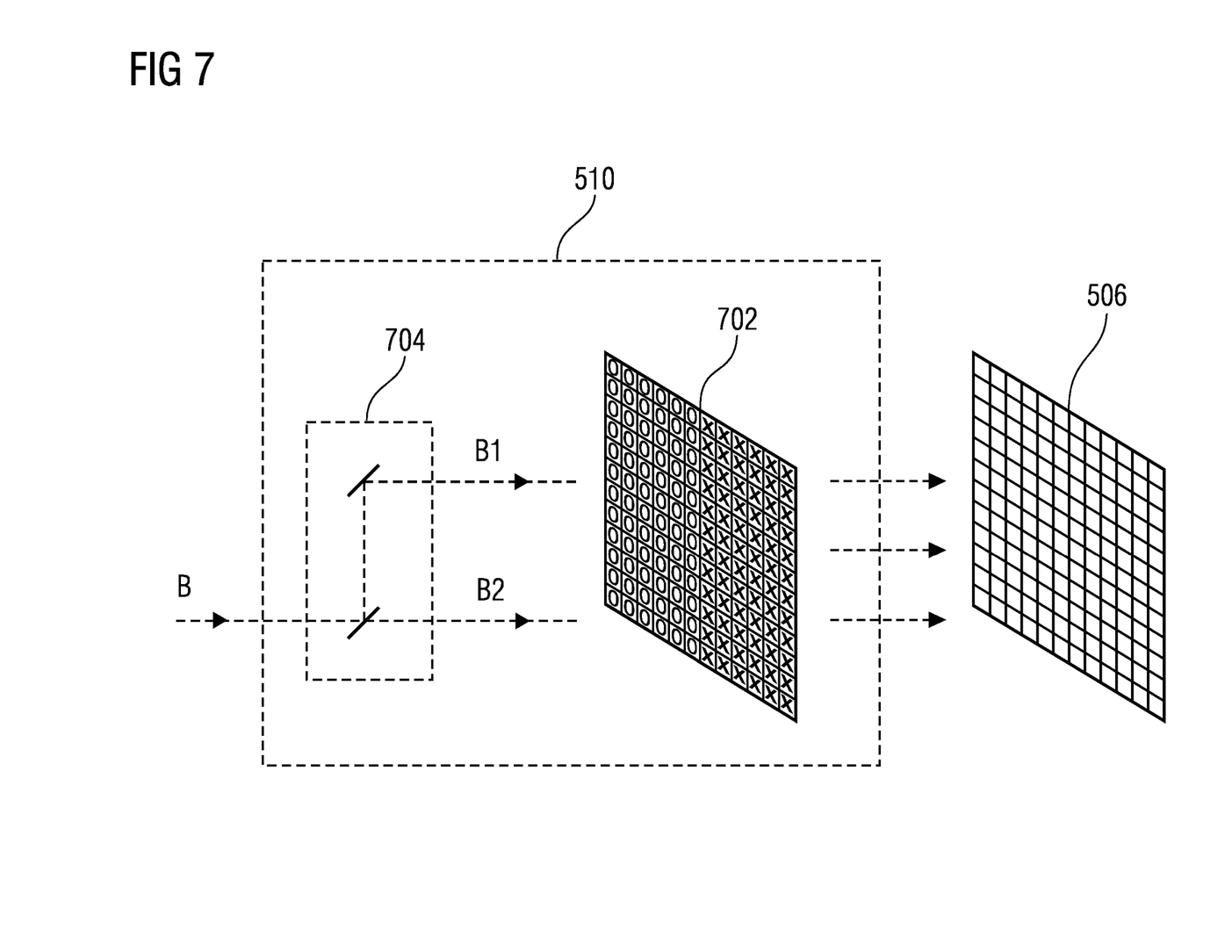
FIG. 7 illustrates a schematic representation of an optical filter assembly in accordance with a second embodiment of the present invention.

While several arrangements with different correspondence between the image conduit 504, the optical filter assembly 510, and the sensor array 506 are possible, two exemplary arrangements will now be put forth in conjunction with FIGS. 6 and 7.

Referring now to FIG. 6, a schematic representation of an optical filter assembly 510 is shown in accordance with a first embodiment of the present invention.

In this embodiment, the optical filter assembly 510 includes an array of filter elements 602. In the array of filter elements 602 shown in the adjoining figure, the first set of filter elements (marked with 'o') and the second set of filter elements (marked as 'x') are randomly arranged to form an integrated two-dimensional array. Further, in this embodiment, the optical filter assembly 510 is arranged such as to provide a one-to-one correspondence with individual imaging fibers 402 such that light emanating from individual imaging fibers 402 at the image processing end 504b is provided to only one of the first and second sets of filters.

Referring now to FIG. 7, a schematic representation of an optical filter assembly 510 is shown in accordance with a second embodiment of the present invention.

In this embodiment, the optical filter assembly 510 includes an array of filter elements 702 and a beam-splitting arrangement 704.

In the array of filter elements 702 shown in the adjoining figure, the first set of filter elements (marked with 'o') and the second set of filter elements (marked as 'x') are arranged in individual two-dimensional arrays. As shown, the two individual two-dimensional arrays are arranged in an adjoining manner. The beam-splitting arrangement 704 is such that light B emanating from the image processing end 504b is split into a plurality of beams $B_1$, $B_2$. Each individual beam $B_1$, $B_2$ is provided to one of the arrays of the first and second sets of filter elements.

The adjoining figure depicts an arrangement of half-mirrors to implement the beam-splitting arrangement 704. In various exemplary embodiments of the present invention, any suitable beam-splitting arrangement, such as a beam-splitting cube and so on, known in the art may be used.

It should be noted that only a first and a second set of filter elements have been discussed for exemplary purposes. In practice, any number of such sets of filter elements may be used depending upon number of different spectral ranges desired to be imaged using the light received from the object plane. Accordingly, the present invention contemplates arrays of filter elements 602, 702, which have individual sets of filter elements corresponding to infra-red range, red, blue, green wavelength ranges within the visible spectrum, and so on.

Referring back to FIG. 5, the signal processing device 508 is configured for integrated processing of the sampled image signals corresponding to the different spectral regions. The signal processing device 508 generates estimated image signals from the sampled image signals as per the techniques of the present invention described in the preceding discussion. The estimated image signals, thus generated, enable reconstruction of a multispectral image of the field of view in the object plane $P_o$.

Figure 8:
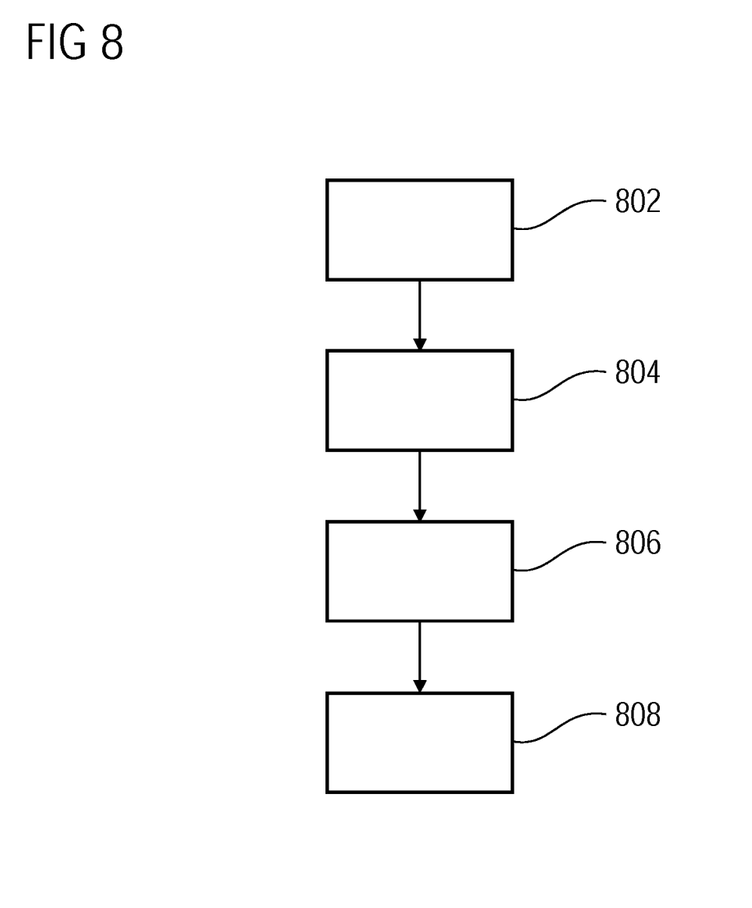
FIG. 8 illustrates a flowchart for a method for image acquisition suitable for use in a turbine engine in accordance with a first embodiment of the present invention.

Referring now to FIG. 8, a flowchart for a method for image acquisition suitable for use in a turbine engine is shown in accordance with a first embodiment of the present invention At step 802, light received from a field of view in an object plane is projected onto an image plane through an optical modulation device. The optical modulation device is characterized by a first transfer function.

At step 804, light is transferred through an image conduit. The image conduit comprises a set of imaging fibers arranged to form an image acquisition end and an image processing end. The image acquisition end is arranged to substantially coincide with the image plane such that light projected onto individual regions within the image plane corresponding to individual imaging fibers is transferred to the image processing end. The image conduit is characterized by a second transfer function.

At step 806, a set of sampled image signals are generated in a sensing basis based on light received from individual imaging fibers at the image processing end.

At step 808, the sampled image signals are transformed from the sensing basis to a representation basis and a set of estimated image signals are generated therefrom based on said first and second transfer functions, wherein the representation basis provides a sparser representation of the sampled image signals relative to the sensing basis, and further wherein the number of estimated image signals is greater than the number of sampled image signals.

Further, at this step, an image and/or a motion-video is reconstructed.

In one embodiment, the first and the second transfer functions are evaluated for a single object plane. The estimated image signals, thus generated, based on the first and the second transfer functions facilitate reconstructing a two-dimensional image of region of interest within the field of view.

In another embodiment, multiple sets of each of the first and the second transfer functions are evaluated, the multiple sets of transfer functions corresponding to multiple object planes located at varying depths relative to the image plane. The estimated image signals thus generated based on multiple set of the first and the second transfer functions facilitate reconstructing a three-dimensional image of region of interest within the field of view.

In yet another embodiment, the sampled image signals generated during successive time instances. The sampled image signals therefore, reside in a three-dimensional spatio-temporal domain. The estimated image signals are generated for successive time instances based on integrated processing of the sampled image signals for reconstructing a motion-video in an optimized manner.

As explained earlier, with regard to motion-video reconstruction, it should be noted that if a region of interest is such that it follows a predefined periodic motion, such as in case a region of interest is a rotor blade, the reconstruction process may be suitably adapted using image correlation techniques to exploit such knowledge of path of region of interest to facilitates even faster reconstruction.

Figure 9:
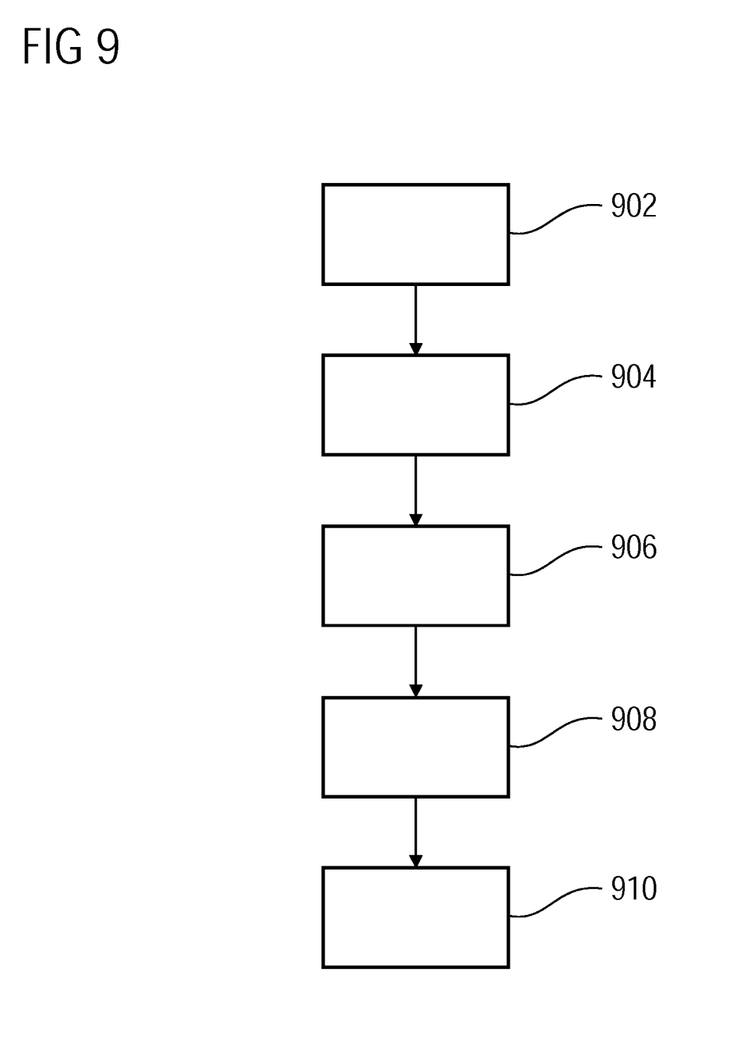
FIG. 9 illustrates a flowchart for a method for image acquisition suitable for use in a turbine engine in accordance with a second embodiment of the present invention.

Referring now to FIG. 9, a flowchart for a method for image acquisition suitable for use in a turbine engine is shown in accordance with a second embodiment of the present invention.

The steps 902 and 904 are same as steps 802 and 804 explained in conjunction with FIG. 8.

At step 906, at least a first set of filter elements and a second set of filter elements are provided. The first and second set of filter elements being transmissive to light in a first and a second wavelength range respectively. The light emanating from individual imaging fibers at the image processing end is filtered independently using at least one of the first and second filter elements prior to generating the sampled image signals therefrom at step 908 such that the sampled image signals correspond to at least two different spectral regions. The step 908 is same as step 806 explained in conjunction with FIG. 8.

At step 910, a multispectral image is reconstructed based on estimated image signals, wherein the estimated image signals are generated based on integrated processing of the sampled image signals corresponding to the different spectral regions.

Thus, the present invention provides a system and a method for image acquisition suitable for use in a turbine engine for online condition monitoring.

The present invention advantageously provides system and method for image acquisition based on an image conduit with a compact form-factor owing to requirement of a relatively smaller number of optical fibers, thereby, improving accessibility to various regions of interest within the turbine engine. At the same time, resolution of resultant image and/or motion-video is improved.

While the present invention has been described in detail with reference to certain embodiments, it should be appreciated that the present invention is not limited to those embodiments. In view of the present disclosure, many modifications and variations would present themselves, to those of skill in the art without departing from the scope and spirit of this invention. The scope of the present invention is, therefore, indicated by the following claims rather than by the foregoing description. All changes, modifications, and variations coming within the meaning and range of equivalency of the claims are to be considered within their scope.

What is claimed is:

1. A system for image acquisition suitable for use in a turbine engine, said system comprising:
a coded-aperture mask, said coded-aperture mask having a plurality of apertures configured for projecting light received from a field of view in an object plane onto an image plane, wherein said coded-aperture mask is characterized by a first transfer function,
an image conduit, said image conduit comprising a set of imaging fibers arranged to form an image acquisition end and an image processing end, said image acquisition end being arranged to substantially coincide with said image plane such that each imaging fiber acquires light projected onto a corresponding region within said image plane, and transfers said light to said image processing end, wherein said image conduit is characterized by a second transfer function,
a sensor array, said sensor array comprising a set of light sensing elements arranged to receive light from individual imaging fibers at said image processing end, and generate corresponding sampled image signals in a sensing basis, and
a signal processing device, said signal processing device configured for transforming said sampled image signals from said sensing basis to a representation basis and generating a set of estimated image signals therefrom based on said first and second transfer functions, wherein said representation basis provides a sparser representation of said sampled image signals relative to said sensing basis, and further wherein the number of estimated image signals is greater than the number of sampled image signals to increase image resolution for a given number of imaging fibers in said image conduit and reduce a number of imaging fibers to provide an image conduit having a reduced form-factor to enable access to regions of interest within the turbine engine,
wherein the image conduit is enabled to access regions that are less than 8 mm in diameter,
wherein the intensity pattern of light on the image plane is related to the intensity pattern of the light in the object plane through the first transfer function, and
wherein the light intensity on the image processing end is related to the light intensity on the acquisition end through the second transfer function.

2. The system according to claim 1, wherein said image conduit further comprises a set of illuminating fibers configured for receiving illuminating light from a light source arranged adjacent to said image processing end and transferring said illuminating light to said object plane.

3. The system according to claim 1, wherein said coded-aperture mask is electrically reconfigurable to vary said field of view in said object plane.

4. The system according to claim 1, wherein said signal processing device is configured for evaluating said first and second transfer functions for a single object plane and generating said estimated image signals based on said first and second transfer functions for reconstructing a two-dimensional image.

5. The system according to claim 1, wherein said signal processing device is configured for evaluating said first and second transfer functions for a set of object planes located at varying depths relative to said image plane and generating said estimated image signals based on said first and second transfer functions for reconstructing a three-dimensional image.

6. The system according to claim 1, wherein said signal processing device is configured for integrated processing of said sampled image signals generated during successive time instances and generate estimated image signals for successive time instances for reconstructing a motion-video.

7. The system according to claim 1 further comprising an optical filter assembly disposed intermediate said image processing end and said sensor array, said optical filter assembly comprising at least a first set of filter elements and a second set of filter elements, said first and second set of filter elements being transmissive to light in a first and a second wavelength range respectively, wherein said optical filter assembly is arranged to maintain a one-to-one correspondence between said filter elements and said light sensing elements such that said sensor array generates sampled image signals corresponding at least two different spectral regions.

8. The system according to claim 7, wherein said first and second sets of filter elements are randomly arranged in an integrated two-dimensional array in a one-to-one correspondence with individual imaging fibers such that light emanating from individual imaging fibers at said image processing end is provided to one of said first and second sets of filters.

9. The system according to claim 7, wherein said first second sets of filter elements are arranged in individual two-dimensional arrays, and wherein said optical filter assembly further comprises a beam-splitting arrangement such that light emanating from said image processing end is split into a plurality of beams, each individual beam being provided to one of said two-dimensional arrays of said first and second sets of filter elements.

10. The system according to claim 7, wherein said signal processing device is configured for integrated processing of said sampled image signals corresponding to said different spectral regions and generating estimated image signals for reconstructing a multispectral image.

11. A method for image acquisition suitable for use in a turbine engine, said method comprising:
projecting light received from a field of view in an object plane onto an image plane through a coded-aperture mask, wherein said coded-aperture mask is characterized by a first transfer function,
transferring light through an image conduit, said image conduit comprising a set of imaging fibers arranged to form an image acquisition end and an image processing end, said image acquisition end being arranged to substantially coincide with said image plane such that light projected onto individual regions within said image plane corresponding to individual imaging fibers is transferred to said image processing end, wherein said image conduit is characterized by a second transfer function,
generating a set of sampled image signals in a sensing basis based on light received from individual imaging fibers at said image processing end, and
transforming said sampled image signals from said sensing basis to a representation basis and generating a set of estimated image signals therefrom based on said first and second transfer functions, wherein said representation basis provides a sparser representation of said sampled image signals relative to said sensing basis, and further wherein the number of estimated image signals is greater than the number of sampled image signals to increase image resolution for a given number of imaging fibers in said image conduit and reduce a number of imaging fibers to provide an image conduit having a reduced form-factor to enable access to regions of interest within the turbine engine,
wherein the image conduit is enabled to access regions that are less than 8 mm in diameter,
wherein the intensity pattern of light on the image plane is related to the intensity pattern of the light in the object plane through the first transfer function, and
wherein the light intensity on the image processing end is related to the light intensity on the acquisition end through the second transfer function.

12. The method according to claim 11, wherein said image conduit further comprises a set of illuminating fibers configured for receiving illuminating light from a light source arranged adjacent to said image processing end and transferring said illuminating light to said object plane.

13. The method according to claim 11, wherein said coded-aperture mask is electrically reconfigurable to vary said field of view in said object plane.

14. The method according to claim 11 further comprising reconstructing a two-dimensional image based on said estimated image signals, wherein said estimated image signals are generated based on said first and second transfer functions corresponding to a single object plane.

15. The method according to claim 11, further comprising reconstructing a three-dimensional image based on said estimated image signals, wherein said estimated image signals are generated based on said first and second transfer functions corresponding to a set of object planes located at varying depths relative to said image plane.

16. The method according to claim 11 further comprising reconstructing a motion-video based on said estimated image signals, wherein said estimated image signals are generated for successive time instances based on integrated processing of said sampled image signals generated during successive time instances.

17. The method according to claim 11 further comprising providing at least a first set of filter elements and a second set of filter elements, said first and second set of filter elements being transmissive to light in a first and a second wavelength range respectively, and filtering light emanating from individual imaging fibers at said image processing end independently using at least one of said first and second filter elements prior to generating said sampled image signals therefrom such that said sampled image signals correspond to at least two different spectral regions.

18. The method according to claim 17 further comprising randomly arranging said first and second sets of filter elements in an integrated two-dimensional array in a one-to-one correspondence with individual imaging fibers such that light emanating from individual imaging fibers at said image processing end is provided to one of said first and second sets of filters.

19. The method according to claim 17 further comprising arranging said first second sets of filter elements in individual two-dimensional arrays, splitting light emanating from said image processing end into a plurality of beams, and providing each individual beam to one of said two-dimensional arrays of said first and second sets of filter elements.

20. The method according to claim 17 further comprising reconstructing a multispectral image based on estimated image signals, wherein said estimated image signals are generated based on integrated processing of said sampled image signals corresponding to said different spectral regions.

* * * * *